(12) United States Patent
Yoon et al.

(10) Patent No.: US 10,591,777 B2
(45) Date of Patent: Mar. 17, 2020

(54) DISPLAY DEVICE WITH POLARIZER

(71) Applicant: Samsung Display Co., Ltd., Yongin-si, Gyeonggi-do (KR)

(72) Inventors: Hyung Guen Yoon, Hwaseong-si (KR); Jae Hong Park, Seoul (KR); Dong Han Song, Hwaseong-si (KR); Ji Yun Park, Hwaseong-si (KR); Sang Hee Yu, Hwaseong-si (KR); Kyung Seon Tak, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 2 days.

(21) Appl. No.: 15/688,607

(22) Filed: Aug. 28, 2017

(65) Prior Publication Data
US 2018/0081242 A1   Mar. 22, 2018

(30) Foreign Application Priority Data
Sep. 20, 2016   (KR) ........................ 10-2016-0120227

(51) Int. Cl.
*G02F 1/1335* (2006.01)

(52) U.S. Cl.
CPC .. *G02F 1/133621* (2013.01); *G02F 1/133536* (2013.01); *G02F 2203/02* (2013.01)

(58) Field of Classification Search
None
See application file for complete search history.

(56) References Cited

U.S. PATENT DOCUMENTS

| | | | |
|---|---|---|---|
| 6,300,929 B1 | 10/2001 | Hisatake et al. | |
| 9,128,334 B1* | 9/2015 | Chen | G02F 1/133528 |
| 2008/0068523 A1* | 3/2008 | Mitsui | G02F 1/133555 |
| | | | 349/37 |
| 2013/0329171 A1* | 12/2013 | Xu | G02F 1/134363 |
| | | | 349/106 |
| 2015/0228232 A1* | 8/2015 | Lee | G09G 3/3607 |
| | | | 345/88 |
| 2018/0188610 A1* | 7/2018 | Shimizu | G09G 3/20 |

* cited by examiner

*Primary Examiner* — Roy P Rabindranath
(74) *Attorney, Agent, or Firm* — Innovation Counsel LLP

(57) ABSTRACT

A display device comprising: a first substrate, a second substrate facing the first substrate, a color conversion layer disposed on one surface of the second substrate and including quantum dots; a first circular polarizer disposed on the color conversion layer and a second circular polarizer disposed on either one surface of the first substrate facing one surface of the second substrate or the other surface opposed to the one surface of the first substrate.

20 Claims, 16 Drawing Sheets

DISPLAY DEVICE WITH POLARIZER

CROSS-REFERENCE TO RELATED APPLICATION

This application claims priority from and the benefit of Korean Patent Application No. 10-2016-0120227, filed on Sep. 20, 2016, which is hereby incorporated by reference for all purposes as if fully set forth herein.

BACKGROUND

1. Technical Field

The present inventive concept relates to a display device.

2. Description of the Related Art

A liquid crystal display (LCD) is presently one of most widely used flat panel display devices, and includes two substrates having electric field generating electrodes such as pixel electrodes and a common electrode formed thereon, and a liquid crystal layer sandwiched between the substrates. An LCD is configured in that a voltage is applied to the electric field generating electrodes so as to generate an electric field in the liquid crystal layer, which thus determines the orientation of liquid crystal molecules of the liquid crystal layer and controls the polarization of incident light, thereby displaying desired images.

Among liquid crystal displays, a vertically aligned mode liquid crystal display in which the major axes of the liquid crystal molecules are aligned perpendicular to upper and lower display panels in the absence of electric field has attracted recent attention due to its merits of high contrast ratio and wide reference viewing angle.

SUMMARY

An embodiment of the present inventive concept provides a display device which does not a linear polarizer.

Another embodiment of the present inventive concept provides a display device robust against texture phenomenon.

Still another embodiment of the present inventive concept provides a display device with enhanced response characteristics and transmittance.

However, embodiments of the present inventive concept are not restricted to those set forth herein. The other embodiments of the present inventive concept which are not mentioned herein will become more apparent to a person skilled in the art to which the present inventive concept pertains by referencing the detailed description of the present inventive concept given below.

According to an aspect of the present inventive concept, there is provided a display device including a first substrate; a second substrate facing the first substrate; a color conversion layer disposed on one surface of the second substrate and including quantum dots; a first circular polarizer disposed on the color conversion layer; and a second circular polarizer disposed on either one surface of the first substrate facing one surface of the second substrate or the other surface of the first substrate opposed to the one surface of the first substrate.

The first circular polarizer may pass, from among light provided to the first circular polarizer, light circularly polarized in a first direction about a transmission axis, and the second circular polarizer may pass, among light provided to the second circular polarizer, light circularly polarized in a second direction about a transmission axis.

The first direction and the second direction may be the same as or opposite to each other about the transmission axis.

The display device may further include a second electrode disposed on the second circular polarizer; a first electrode disposed on the first substrate and overlapped with the first electrode; and a liquid crystal layer interposed between the first substrate and the second substrate.

The liquid crystal layer may include a plurality of liquid crystal molecules having negative dielectric anisotropy, and when an electric field is generated between the first electrode and the second electrode, the liquid crystal layer may change a phase of light provided to the liquid crystal layer as much as $\pi/2$.

The liquid crystal layer may include a plurality of liquid crystal molecules having positive dielectric anisotropy, and when an electric field is not generated between the first electrode and the second electrode, the liquid crystal layer may change a phase of light provided to the liquid crystal layer as much as $\pi/2$.

At least one of the first circular polarizer and the second circular polarizers may include an organic material.

The color conversion layer may include a first wavelength conversion layer for receiving light having a first wavelength region and converting the light having a first wavelength region into light having a second wavelength region; a second wavelength conversion layer for receiving light having a first wavelength region and converting the light having a first wavelength region into light having a third wavelength region; and a transmission layer for transmitting the light having the first wavelength region, wherein the quantum dots may be included in the first and second wavelength conversion layers.

The light having a first wavelength region may be blue light, the light having a second wavelength region may be red light, and the light having a third wavelength region may be green light.

According to another aspect of the present inventive concept, there is provided a display device including a first substrate; a second substrate facing the first substrate; a liquid crystal layer interposed between the first substrate and the second substrate; a color conversion layer disposed on the second substrate and including quantum dots; and a first circular polarizer disposed on the color conversion layer, wherein the first circular polarizer may pass, from among light passing through the liquid crystal layer, light circularly polarized in a first direction about a transmission axis.

The display device may further include a second circular polarizer disposed on either one surface or the other surface of the first substrate, and the second circular polarizer may pass, from among light provided to the second circular polarizer, light circularly polarized in a second direction about the transmission axis, and the first direction and the second direction may be opposite to each other about the transmission axis.

The liquid crystal layer may include a plurality of liquid crystal molecules having negative dielectric anisotropy, and when an electric field is generated in the liquid crystal layer, the liquid crystal layer may change a phase of light provided to the liquid crystal layer as much as $\pi/2$.

The liquid crystal layer may include a plurality of liquid crystal molecules having positive dielectric anisotropy, and when an electric field is not generated in the liquid crystal layer, the liquid crystal layer may change a phase of light provided to the liquid crystal layer as much as $\pi/2$.

The display device may further include a second circular polarizer disposed on either one surface or the other surface of the first substrate, and the second circular polarizer may pass light circularly polarized in a second direction about the transmission axis among light provided to the second circular polarizer, and the first direction and the second direction may be the same about the transmission axis.

The first substrate may include one surface facing the second substrate, and the other surface opposite to the one surface of the first substrate, and the display device may further include a wave plate disposed on the other surface of the first substrate, and the wave plate may include a linear polarizer for transmitting linearly polarized light among light provided to the wave plate, and a phase retarder for changing a phase of the linearly polarized light as much as $\pi/4$.

The display device may further include a backlight unit for providing a light having a first wavelength region to the first substrate.

The light having a first wavelength region provided from the backlight unit may be circularly polarized in a second direction opposite to the first direction about the transmission axis.

The color conversion layer may include a first wavelength conversion layer for receiving the light having a first wavelength region and converting the light having a first wavelength region into light having a second wavelength region; a second wavelength conversion layer for receiving the light having a first wavelength region and converting the light into light having a first wavelength region having a third wavelength region; and a transmission layer for transmitting the light having a first wavelength region, wherein the quantum dots may be included in the first and second wavelength conversion layers.

The light having a first wavelength region may be blue light, the light having a second wavelength region may be red light, and the light having a third wavelength region may be green light.

The first circular polarizer may include an organic material.

Other specific details of the embodiments of the present inventive concept are described below with reference to the drawings in the detailed description.

The embodiments of the present inventive concept may eliminate the necessity of a linear polarizer.

Furthermore, robustness against texture phenomenon, and enhanced characteristics and transmission may be achieved.

Furthermore, an influence caused by misalignment during bonding between a lower substrate and an upper substrate may be minimized.

However, effects of the present inventive concept are not restricted to the exemplary embodiments set forth herein and more diverse effects are included in this description.

DETAILED DESCRIPTION OF THE EMBODIMENTS

Figure 1:
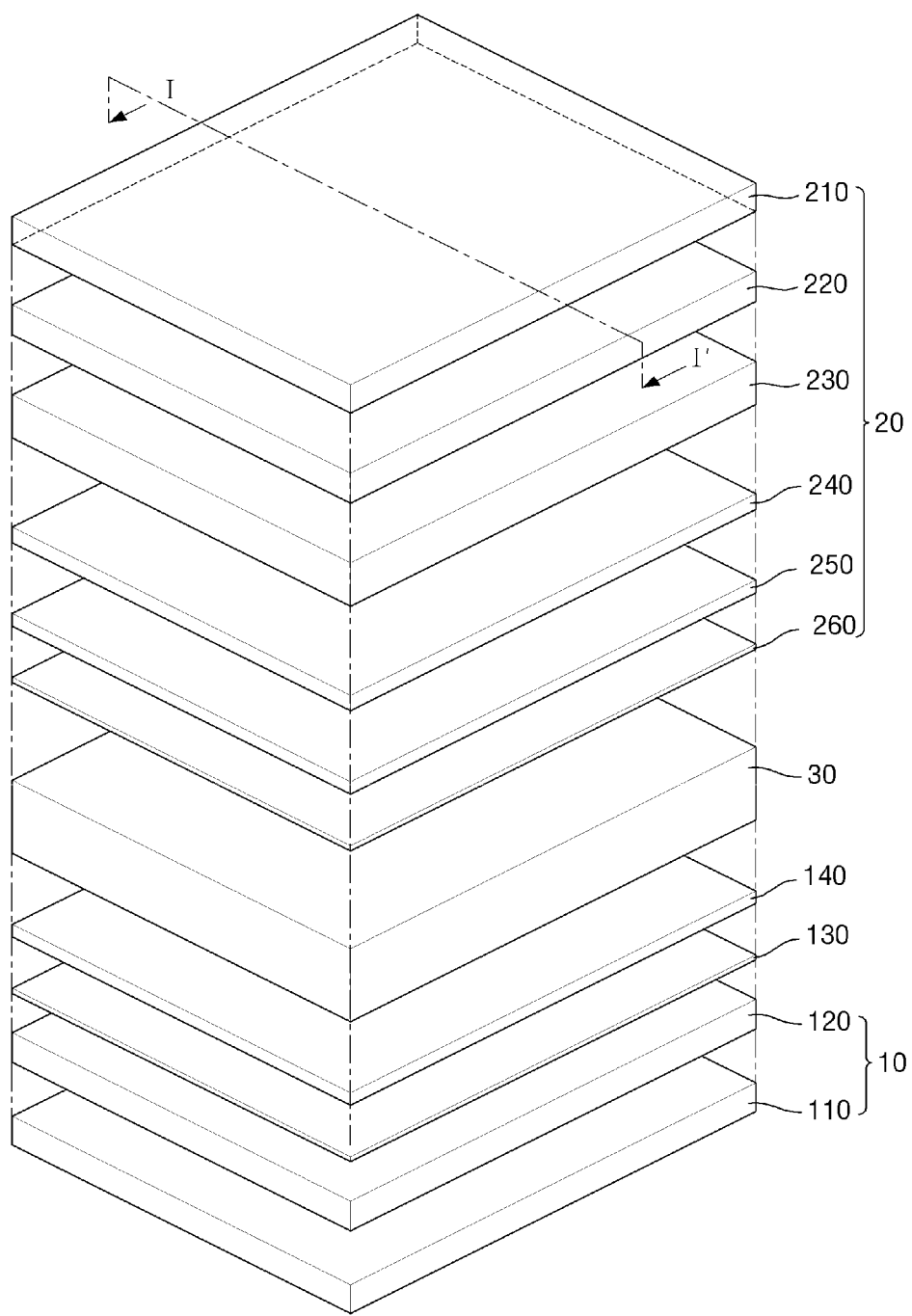
FIG. 1 is a schematic perspective view illustrating a display device according to one exemplary embodiment of the present inventive concept.

The advantages and features of the present inventive concept and methods for accomplishing the same will become apparent by referring to the preferred embodiments thereof described below with reference to the attached drawings. The present inventive concept may, however, be embodied in different forms and should not be construed as limited to the embodiments set forth herein. Rather, these embodiments are provided so that this disclosure will be thorough and complete, and the present inventive concept will be defined by the scope of claims.

It will also be understood that when an element or a layer is referred to as being "on" another element or layer, it can be directly on the other element or layer, or intervening layers may also be present. In contrast, when an element is referred to as being "directly on" or "immediately on" another element, there are no intervening elements or layers present.

Spatially relative terms such as "below", "beneath", "lower", "above", "on", "upper", and the like, may be used for ease of describing the relative positions between one element or components and another element or components, as shown in the drawings. Spatially relative terms should be construed as terms including different directions of elements during use or operation in addition to the directions shown in the drawings. For example, when elements shown in the drawings are turned upside down, the element described as being "below" another element may be placed "above" another element. Furthermore, elements described as being positioned at "leftside" of another element may be positioned at "rightside" of the other element in the drawings depending on a point of sight. Therefore, exemplary terms "below" may include both downward and backward directions. Elements may be oriented in different directions, and in this case, spatially relative terms may be construed depending on the orientation.

It will be understood that, although the terms first, second, etc. may be used herein to describe various elements, these elements should not be limited by these terms. These terms are only used to distinguish one element from another element. Thus, for example, a first component discussed below could be termed a second component without departing from the teachings of the present inventive concept. As used herein, use of a singular article does not exclude pluralities of the article's object unless the context clearly and unambiguously dictates otherwise. It will be further understood that the terms such as "comprise" or "include,"

when used in this specification, specify the presence of stated features, integers, steps, operations, elements, components, or combinations thereof but do not preclude the presence or addition of one or more other features, integers, steps, operations, elements, components, or combinations thereof.

The same reference numbers indicate the same or similar components throughout the specification.

Embodiments of the present inventive concept will hereinafter be described with reference to the drawings.

Figure 2:
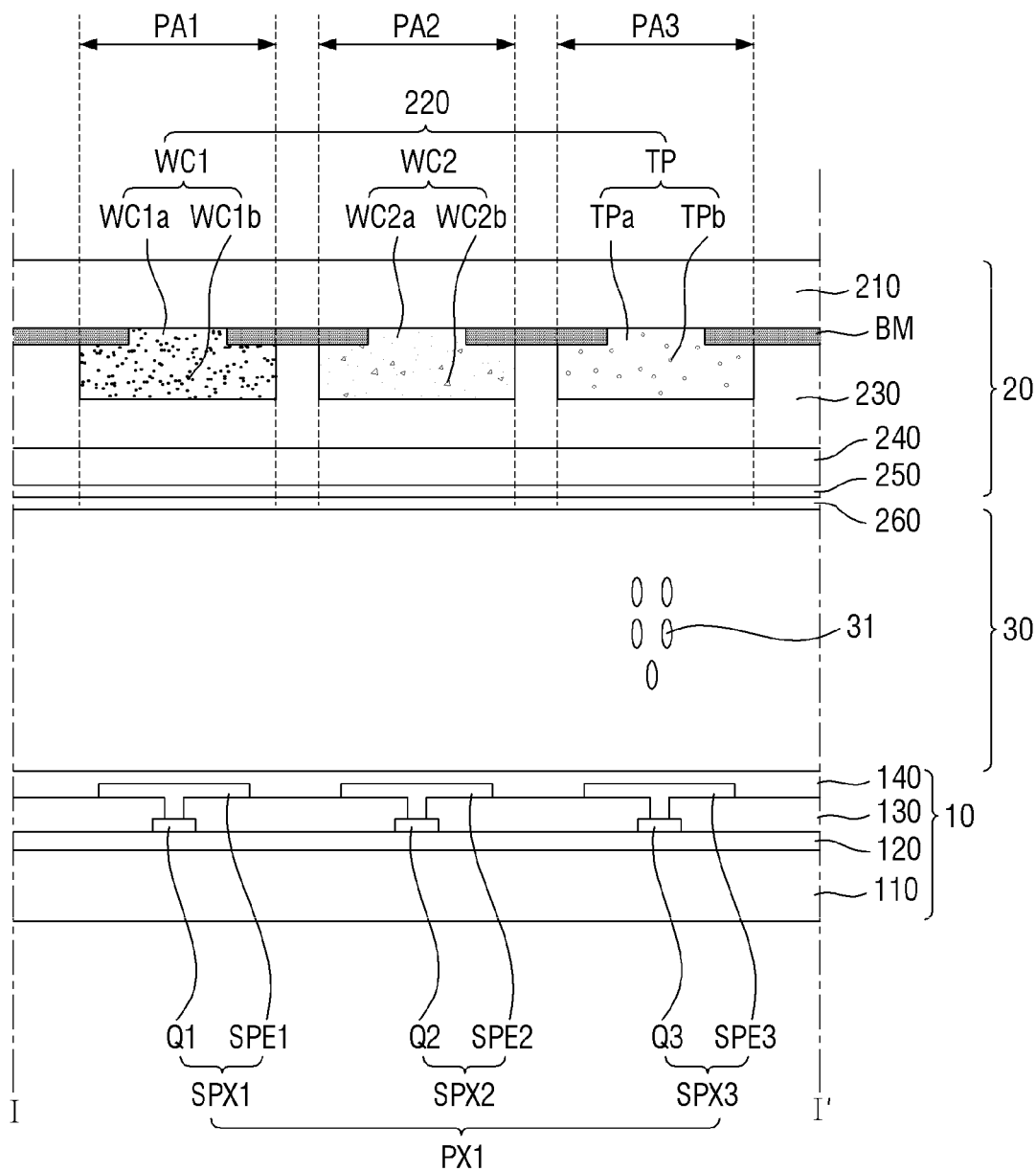
FIG. 2 is a cross-sectional view taken along line I-I' of FIG. 1.
Figure 3:
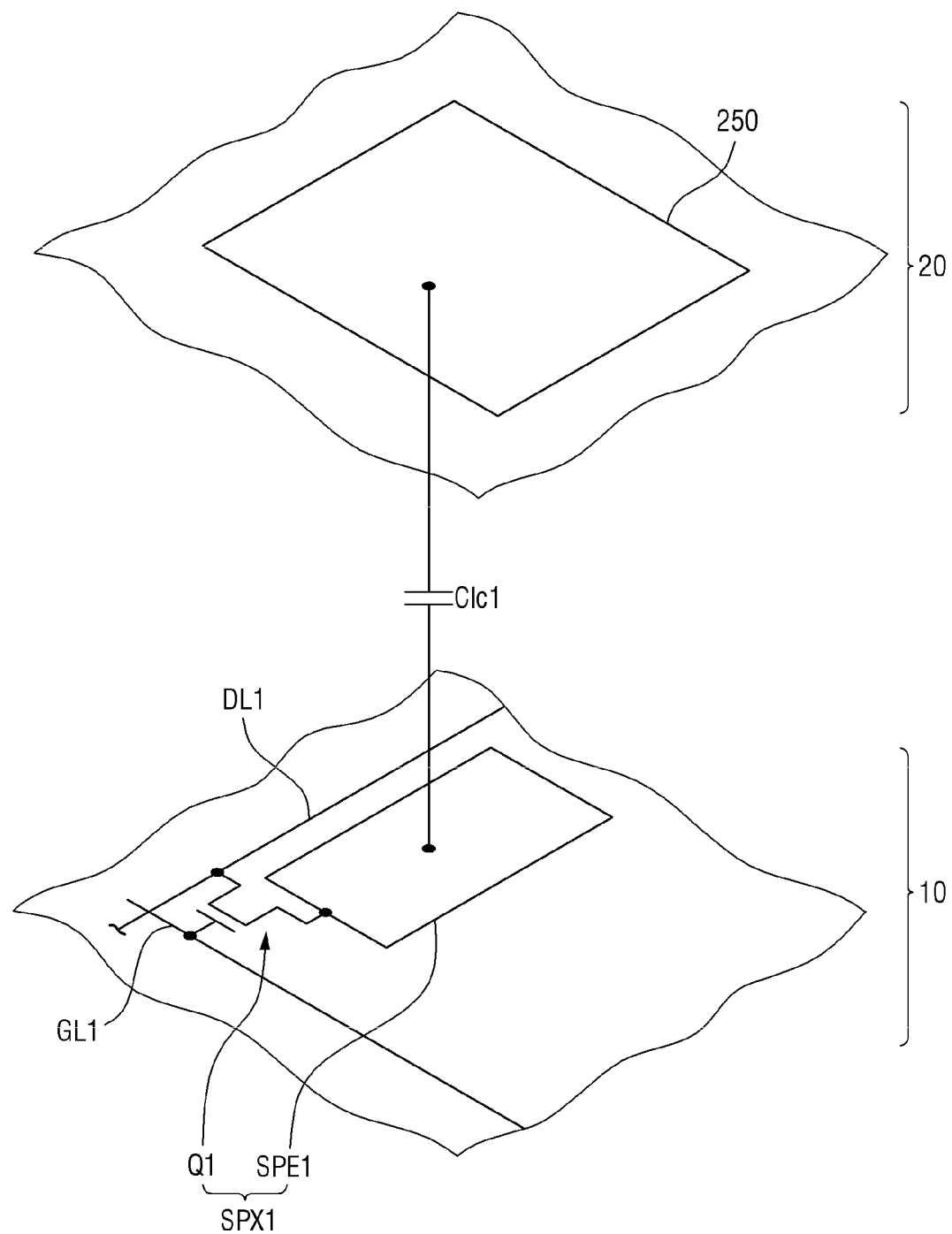
FIG. 3 schematically illustrates a first subpixel unit shown in FIG. 2.

FIG. 1 is a schematic perspective view illustrating a display device according to one exemplary embodiment of the present inventive concept. FIG. 2 is a cross-sectional view taken along line I-I' of FIG. 1. FIG. 3 schematically illustrates a first subpixel unit shown in FIG. 2.

Referring to FIG. 1 and FIG. 2, the display device according to one exemplary embodiment of the present inventive concept may include a lower display panel 10, an upper display panel 20, and a liquid crystal layer 30 sandwiched between the lower display panel 10 and the upper display panel 20. The terms "lower" and "upper" as used herein may be defined on the basis of FIG. 1 and FIG. 2.

The upper display panel 20 may include an upper substrate 210, a color conversion layer 220 disposed on the upper substrate 210, a first circular polarizer 240 disposed on the color conversion layer 220, and a first electrode disposed on the first circular polarizer 240. The lower display panel 10 may include a lower substrate 110, a second circular polarizer 120 disposed on the lower substrate 110, and a second electrode facing the first electrode. In an exemplary embodiment, the first electrode may be a common electrode, and the second electrode may be subpixel electrodes included in a respective plurality of pixel units. The first electrode will hereinafter be described as a common electrode 250, and the second electrode as first to third subpixel electrodes SPE1 to SPE3.

The lower display panel 10 may be disposed to face the upper display panel 20. The liquid crystal layer 30 may be sandwiched between the lower display panel 10 and the upper display panel 20, and include a plurality of liquid crystal molecules 31. In an exemplary embodiment, the lower display panel 10 may be bonded to the upper display panel 20 through sealing.

The lower display panel 10 will first be described.

The lower substrate 110 may be, for example, a transparent insulation substrate. In this case, the transparent insulation substrate may include a glass substrate, a quartz substrate, a transparent resin substrate, and the like.

The second circular polarizer 120 may be disposed on the lower substrate 110. More specifically, the second circular polarizer 120 may be disposed on one surface of the lower substrate 110. In this case, one surface of the lower substrate 110 may face the upper substrate 210. The second circular polarizer 120 may include an organic material. The second circular polarizer 120 may transmit light circularly polarized in a second direction d2 (refer to FIG. 4) about a transmission axis pa (refer to FIG. 4) among light provided from an external source. This will be described later with reference to FIG. 4 to FIG. 7.

In an exemplary embodiment, the second circular polarizer 120 may have a bandwidth of 380 nm to 720 nm, and transmit only light circularly polarized in the second direction d2. In another exemplary embodiment, the second circular polarizer 120 may have a bandwidth of 430 nm to 470 nm, and transmit only light circularly polarized in the second direction d2. In an exemplary embodiment, the second circular polarizer 120 may have a thickness of 5 to 20 μm/.

A plurality of pixel units including a first pixel unit PX1 may be disposed on the second circular polarizer 120. The first pixel unit PX1 may include first to third subpixel units SPX1 to SPX3. In an exemplary embodiment, the first to third subpixel units SPX1 to SPX3 may display colors different from each other.

The first subpixel unit SPX1 may include a first switching element Q1, and a first subpixel electrode SPE1 electrically connected to the first switching element Q1. The second subpixel unit SPX2 may include a second switching element Q2, and a second subpixel electrode SPE2 electrically connected to the second switching element Q2. The third subpixel unit SPX3 may include a third switching element Q3, and a third subpixel electrode SPE3 electrically connected to the third switching element Q3.

The switching elements and the subpixel electrodes will be described in more detail on the basis of the first subpixel unit SPX1.

Referring to FIG. 3, in an exemplary embodiment, the first switching element Q1 may be a tri-terminal element such as a thin film transistor. The first switching element Q1 may include a control electrode electrically connected to a first scan line GL1, and one electrode electrically connected to a first data line DL1. The first switching element Q1 may include the other electrode electrically connected to the first subpixel electrode SPE1.

Thus, the first switching element Q1 may be turned on according to a scan signal provided from the first scan line GL1, and provide a data signal provided from the first data line DL1 to the first subpixel electrode SPE1. Although the first subpixel unit SPX1 is described herein as including only one first switching element Q1, the present disclosure is not limited thereto, and the first subpixel unit SPX1 may include two or more switching elements.

The first subpixel electrode SPE1 may be disposed on the lower display panel 10. More specifically, the first subpixel electrode SPE1 may be disposed on the insulation layer 130 formed on the lower substrate 110. The common electrode 250 may be disposed on the upper display panel 20. The first subpixel electrode SPE1 may be at least partially overlapped with the common electrode 250. The term "being overlapped" as used herein may mean an arrangement relationship in which two electrodes are disposed adjacent each other such that the two electrodes can be capacitively coupled. Thus, the first subpixel unit SPX1 may further include a first liquid crystal capacitor Clc1 formed by an overlap between the first subpixel electrode SPE1 and the common electrode 250.

Referring back to FIG. 1 and FIG. 2, the insulation layer 130 may be interposed between the first to third switching elements Q1 to Q3 and the first to third subpixel electrodes SPE1 to SPE3. The insulation layer 130 may include a plurality of contact holes for electrically connecting the first to third switching elements Q1 to Q3 and the first to third subpixel electrodes SPE1 to SPE3, respectively. In an exemplary embodiment, the insulation layer 130 may be made of an inorganic insulation material such as silicon nitride and silicon oxide. In another exemplary embodiment, the insulation layer 130 may include an organic material having superior planarization characteristics and photosensitivity.

The first to third subpixel electrodes SPE1 to SPE3 may be disposed on the insulation layer 220. In an exemplary embodiment, the first to third subpixel electrodes SPE1 to SPE3 may be made of a transparent conductive material such as ITO and IZO, or reflective metal such as aluminum, silver, chrome, or an alloy thereof. The first to third subpixel electrodes SPE1 to SPE3 may respectively overlap the common electrode 250.

The first subpixel electrode SPE1 may be overlapped with a first wavelength conversion layer WC1. The second subpixel electrode SPE2 may be overlapped with a second wavelength conversion layer WC2. The third subpixel electrode SPE3 may be overlapped with a transmission layer TP. This will be described later.

A lower alignment layer 140 may be disposed on the first to third subpixel electrodes SPE1 to SPE3. The lower alignment layer 140 may be made of polyimide and the like.

The upper display panel 20 will now be described.

The upper substrate 210 may be disposed to face the lower substrate 110. The upper substrate 210 may be made of transparent glass, plastic, or the like, and in an exemplary embodiment, the upper substrate 210 may be made of a same material as that of the lower substrate 110.

A black matrix BM may be disposed on the upper substrate 210 so as to prevent light from being transmitted to a region other than a pixel region. In an exemplary embodiment, the black matrix BM may be made of an inorganic material or a metal material including chrome.

The color conversion layer 220 may be disposed on the black matrix BM. More specifically, the color conversion layer 220 may be disposed in a region of the upper substrate 210, in which the black matrix BM is not disposed, and the color conversion layer 220 may be at least partially overlapped with the black matrix BM. The color conversion layer 220 may include the first wavelength conversion layer WC1, the second wavelength conversion layer WC2, and the transmission layer TP.

The first wavelength conversion layer WC1 may be overlapped with the first subpixel electrode SPE1 in a vertical direction about the lower substrate 110. Thus, a first subpixel region PA1 for displaying light having the second wavelength region may be formed.

In an exemplary embodiment, the first wavelength conversion layer WC1 may include first light transmitting resin WC1a, and a first wavelength conversion material WC1b dispersed in the first light transmitting resin WC1a so as to convert or shift light provided to the first wavelength conversion layer WC1 into light having the second wavelength region. In this case, the light provided to the first wavelength conversion layer WC1 may have the first wavelength region, and in an exemplary embodiment, the light may be blue light having a central wavelength ranging from 430 nm to 470 nm. The light having the second wavelength region may be red light. That is, the first wavelength conversion layer WC1 may receive blue light from a source external to the first wavelength conversion layer WC1 and convert the received blue light into red light. Thus, the first subpixel region PA1 may display red color.

The second wavelength conversion layer WC2 may be overlapped with the second subpixel electrode SPE2 in a vertical direction about the lower substrate 110. Thus, a second subpixel region PA2 for displaying light having the third wavelength region may be formed.

In an exemplary embodiment, the second wavelength conversion layer WC2 may include second light transmitting resin WC2a, and a second wavelength conversion material WC2b dispersed in the second light transmitting resin WC2a so as to convert or shift light provided to the second wavelength conversion layer WC2 into light having the third wavelength region. In this case, the light having the third wavelength region may be green light. That is, the second wavelength conversion layer WC2 may receive blue light from a source external to the second wavelength conversion layer WC2 and convert the received green light into green light. Thus, the second subpixel region PA2 may display green color.

The transmission layer TP may be overlapped with the third subpixel electrode SPE3 in a vertical direction about the lower substrate 110. Thus, a third subpixel region PA3 for displaying light having the first wavelength region may be formed.

The transmission layer TP may include third light transmitting resin TPa, and a light scattering material TPb disposed in the third light transmitting resin TPa so as to scatter and emit incident light. The transmission layer TP may transmit and scatter light having the first wavelength range provided from a source external to the transmission layer TP, that is, blue light. Thus, the third subpixel region PA3 may display blue color.

The first light transmitting resin WC1a, the second light transmitting resin WC2a, and the third light transmitting resin TPa may respectively be made of a transparent material which transmits incident light without converting the wavelength thereof. The first to third light transmitting resin WC1a, WC2a, TPa may be the same or different materials.

Each of the first wavelength conversion material WC1b and the second wavelength conversion material WC2b may include quantum dots. That is, the first and the second wavelength conversion materials WC1b and WC2b may absorb incident light and emit light having a central wavelength different from that of the incident light. Meanwhile, the first wavelength conversion material WC1b and the second wavelength conversion material WC2b may include quantum rods and phosphor materials.

The first and the second wavelength conversion materials WC1b and WC2b may scatter respectively light incident to the first subpixel region PA1 and the second subpixel region PA2 in various directions regardless of an incident angle, and emit the scattered light. Furthermore, the emitted light may be depolarized and maintained at a depolarized state. The "depolarized light" as used herein may mean light which is not made of only polarization components in a specific direction, that is, light made of random polarization components which are not polarized only in a specific direction. In an exemplary embodiment, the depolarized light may be natural light.

The average particle size of the first wavelength conversion material WC1b may be larger than the average particle size of the second wavelength conversion material WC2b. The first and the second wavelength conversion materials WC1b and WC2b may be the same or different materials. The light scattering material TPb may scatter light incident to the third subpixel region PA3 in various directions regardless of an incident angle, and emit the scattered light. That is, the light scattering material TPb may scatter light being transmitted through the third subpixel region PA3, making characteristics of light emitted from the respective subpixel regions similar to each other.

More specifically, the light scattering material TPb may have a reflective index different from that of the third light transmitting resin TPa. For example, the light scattering material TPb may be organic or inorganic particles, organic-inorganic composite particles, or particles having a hollow structure. In an exemplary embodiment, the organic particles may include acrylic resin particles or urethane resin particles. Furthermore, the inorganic particles may include metal oxide particles such as titanium oxide. A planarization layer 230 may be disposed on the color conversion layer 220. In an exemplary embodiment, the planarization layer 230 may be made of an organic material. When the first wavelength conversion layer WC1, the second wavelength conversion layer WC2, and the transmission layer TP have different thicknesses, the planarization layer 230 may make heights of components stacked on one surface of the upper substrate 210 uniform.

The first circular polarizer 240 may be disposed on the planarization layer 230. The first circular polarizer 240 may include an organic material. In an exemplary embodiment, the first circular polarizer 240 may be formed along a rubbed surface of the planarization layer 230. The first circular polarizer 240 may be interposed between the lower substrate 110 and the upper substrate 210 so as to prevent deformation caused by moisture or heat, and reduce manufacturing cost.

The first circular polarizer 240 may transmit light circularly polarized in the first direction d1 (refer to FIG. 4) about the transmission axis pa (refer to FIG. 4) among light provided from a source external to the first circular polarizer 240. In this case, the first direction d1 and the second direction d2 may be opposite each other about the transmission axis pa. For example, when the first direction d1 means a left direction about the transmission axis pa, the second direction d2 may mean a right direction about the transmission axis pa. Thus, light circularly polarized in the first direction d1 about the transmission axis pa may be left-handed light, and light circularly polarized in the second direction d2 about the transmission axis pa may be right-handed light. This will be described later with reference to FIG. 4 to FIG. 7. In an exemplary embodiment, the first circular polarizer 240 may have a bandwidth of 380 nm to 720 nm, and transmit only light circularly polarized in the first direction d1. In another exemplary embodiment, the first circular polarizer 240 may transmit light having a bandwidth same as that of the second circular polarizer 210. In an exemplary embodiment, the first circular polarizer 240 may have a thickness of 5 to 20 μm.

The common electrode 250 may be disposed on the first circular polarizer 240. The common electrode 250 may be at least partially overlapped with the first to third subpixel electrodes SPE1 to SPE3. In an exemplary embodiment, the common electrode 250 may have a flat plate shape. In an exemplary embodiment, the common electrode 250 may be made of a transparent conductive material such as ITO and IZO, or reflective metal such as aluminum, silver, chrome, or an alloy thereof.

An upper alignment layer 260 may be disposed on the common electrode 250. The upper alignment layer 260 may be made of polyimide and the like.

The liquid crystal layer 30 will now be described.

The liquid crystal layer 30 may include the plurality of liquid crystal molecules 31. In an exemplary embodiment, the plurality of liquid crystal molecules 31 may have negative dielectric anisotropy. In this case, the liquid crystal molecules 31 may be aligned vertically to the lower substrate 110 when no electric field is generated in the liquid crystal layer 30. The plurality of liquid crystal molecules 31 may rotate or tilt in a specific direction when an electric field is generated between the lower substrate 110 and the upper substrate 210, causing a change in the polarization of light.

Alternatively, the plurality of liquid crystal molecules 31 may have positive dielectric anisotropy. In this case, the plurality of liquid crystal molecules 31 may be aligned horizontally to the lower substrate 110 when no electric field is applied to the liquid crystal layer 30. That is, the plurality of liquid crystal molecules 31 may be aligned in parallel to the lower substrate 110 when no electric field is applied to the liquid crystal layer 30. Furthermore, the plurality of liquid crystal molecules 31 may be aligned vertically to the lower substrate 110 when an electric field is generated between the lower substrate 110 and the upper substrate 210.

An operation of the display device of an exemplary embodiment of the present inventive concept will now be described by way of an example in which the plurality of liquid crystal molecules 31 have negative dielectric anisotropy.

Figure 4:
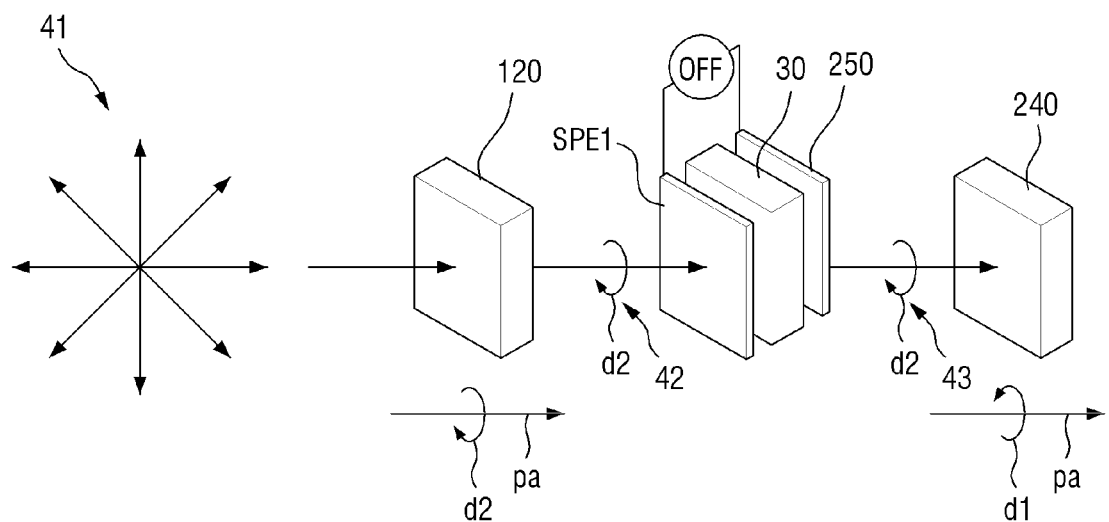
FIG. 4 and FIG. 5 illustrate an operation when an electric field is not generated in a liquid crystal layer according to one exemplary embodiment of the present inventive concept.
Figure 5:
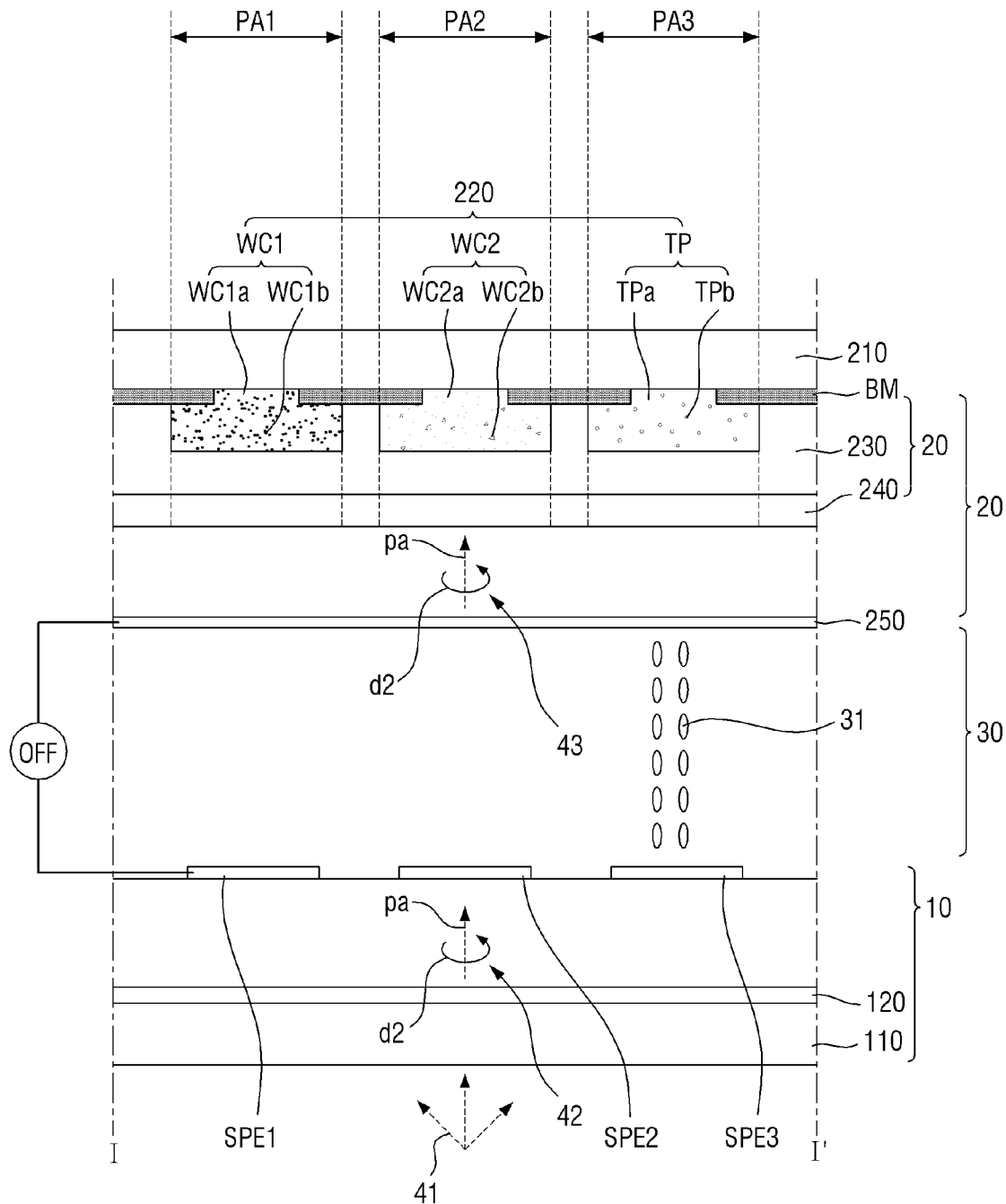
Figure 6:
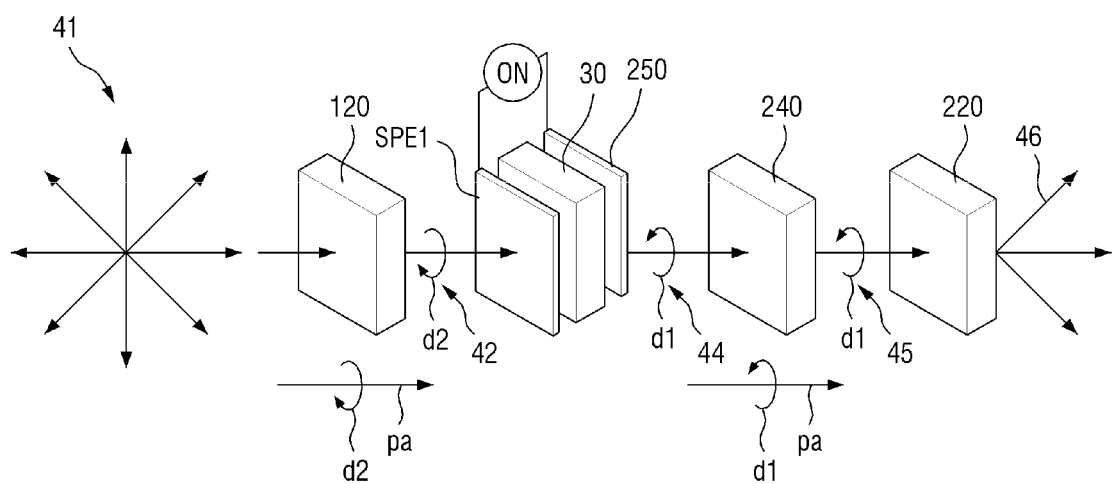
FIG. 6 and FIG. 7 illustrate an operation when an electric field is generated in a liquid crystal layer according to one exemplary embodiment of the present inventive concept.
Figure 7:
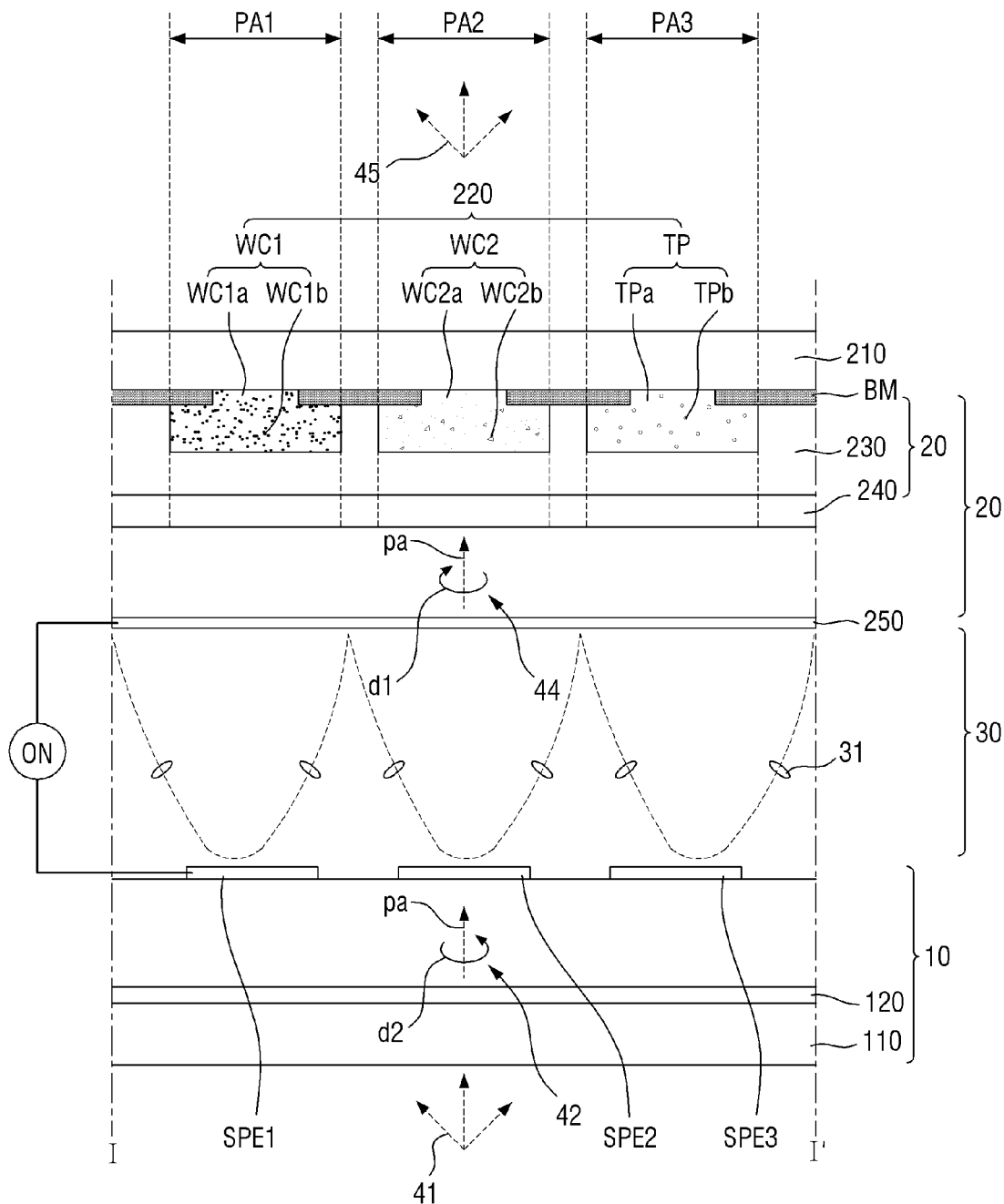

FIG. 4 and FIG. 5 illustrate an operation when an electric field is not generated in a liquid crystal layer according to one exemplary embodiment of the present inventive concept. FIG. 6 and FIG. 7 illustrate an operation when an electric field is generated in a liquid crystal layer according to one exemplary embodiment of the present inventive concept. For convenience, descriptions will be made on the basis of the first subpixel electrode SPE1 among the first to third subpixel electrodes SPE1 to SPE3.

Descriptions will be made first on the operation when an electric field is not generated in the liquid crystal layer 30, with reference to FIG. 4 and FIG. 6. The case where an electric field is not generated may include, for example, the case where voltages are not provided to the respective first subpixel electrode SPE1 and the common electrode 250, or the case where voltages having the same level are provided to the first subpixel electrode SPE1 and the common electrode 250, making electric potential difference zero.

Referring to FIG. 4 and FIG. 5, light 41 at a depolarized state may be provided to the lower substrate 110. In an exemplary embodiment, the light 41 at a depolarized state may be provided from a backlight unit 40 (refer to FIG. 15). The second circular polarizer 120 may transmit only light circularly polarized in the second direction d2 about the transmission axis pa among the light 41 at a depolarized state passed through the lower substrate 110, and blocks the residual light. Thus, light 42 which has passed through the second circular polarizer 120 may be light circularly polarized in the second direction d2 about transmission axis pa. In an exemplary embodiment, the light 42 which has passed through the second circular polarizer 120 may be right-handed light about the transmission axis pa.

Subsequently, the light 42 which has passed through the second circular polarizer 120 may be provided to the liquid crystal layer 30. Since no electric field is generated in the liquid crystal layer 30, the plurality of liquid crystal molecules 31 having negative dielectric anisotropy may be aligned vertically to the lower substrate 110. Thus, the phase of the light 42 which has passed through the second circular polarizer 120 may not change while passing through the liquid crystal layer 30. That is, light 43 which has passed through the liquid crystal layer 30 may be right-handed light about the transmission axis pa. Therefore, the light 42 which has passed through the second circular polarizer 120 and the light 43 which has passed through the liquid crystal layer 30 may have the same phase.

The light 43 which has passed through the liquid crystal layer 30 may be provided to the first circular polarizer 240. The first circular polarizer 240 may transmit only light circularly polarized in the first direction d1 about the transmission axis pa among light provided to the first circular polarizer 240, and blocks the residual light. That is, the first circular polarizer 240 may transmit only left-handed light about the transmission axis pa. As described above, since the light 43 which has passed through the liquid crystal layer 30 is left-handed light about the transmission axis pa, all of the light 43 which has passed through the liquid crystal layer 30 may be blocked by the first circular polarizer 240.

Thus, the display device according to an exemplary embodiment of the present inventive concept may display black when no electric field is generated in the liquid crystal layer 30.

Descriptions will now be made on the operation when an electric field is generated in the liquid crystal layer 30, with reference to FIG. 6 and FIG. 7. The case where an electric field is generated may include, for example, the case where voltages having different electric potentials are provided to the respective first subpixel electrode SPE1 and the common electrode 250, or the case where voltages equal to or higher than 0V are provided to either the first subpixel electrode SPE1 or the common electrode 250. The description redundant with that made with reference to FIG. 4 and FIG. 5 will be omitted.

Referring to FIG. 6 and FIG. 7, the light 42 which has passed through the second circular polarizer 120 may be provided to the liquid crystal layer 30. In this case, since an electric field is generated in the liquid crystal layer 30, the plurality of liquid crystal molecules 31 having negative dielectric anisotropy may be aligned vertically to the generated electric field. In this case, the alignment of the plurality of liquid crystal molecules 31 shown in FIG. 7 is merely an exemplary embodiment, and may vary according to the intensity of the electric field formed in the liquid crystal layer 30, and the like.

The liquid crystal layer 30 may change the phase of at least a part of the light 42 which has passed through the second circular polarizer 120. In an exemplary embodiment, the liquid crystal layer 30 may change the phase of the light 42 which has passed through the second circular polarizer 120 as much as 0 to $\pi/2$. Thus, light 44 which has passed through the liquid crystal layer 30 may include light having a phase which has changed as much as $\pi/2$ as compared with the light 42 which has passed through the second circular polarizer 120. That is, at least a part of the light 44 which has passed through the liquid crystal layer 30 may be light circularly polarized (left-handed) in the first direction d1 about the transmission axis pa.

The light 44 which has passed through the liquid crystal layer 30 may be provided to the first circular polarizer 240. In this case, since the first circular polarizer 240 transmits only light circularly polarized in the first direction d1 about the transmission axis pa, at least a part of the light 44 which has passed through the liquid crystal layer 30 may pass through the first circular polarizer 240.

Light 45 which has passed through the first circular polarizer 240 may be provided to the color conversion layer 220. Thus, the color conversion layer 220 may receive the light 45 which has passed through the first circular polarizer 240 and emit red, green, and blue light, respectively. Furthermore, light 46 which has passed through the color conversion layer 220 may be depolarized and maintained at a depolarized state.

Figure 8:
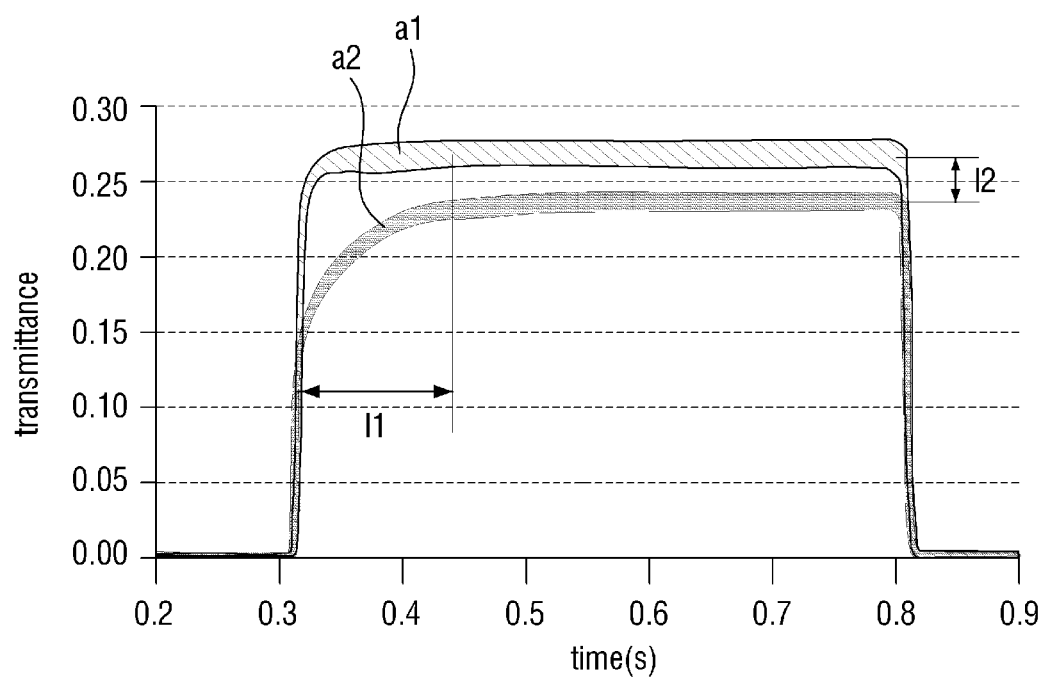
FIG. 8 is a graphical representation illustrating an effect of the display device according to one exemplary embodiment of the present inventive concept.

FIG. 8 is a graphical representation illustrating an effect of the display device according to one exemplary embodiment of the present inventive concept. In this case, a1 denotes an effect of the display device according to one exemplary embodiment of the present inventive concept, and a2 denotes an effect of a display device according to a comparative example using a linear polarizer.

Referring to FIG. 8, of the display device according to one exemplary embodiment of the present inventive concept (a1) has response speed faster than that of the display device according to a comparative example (a2). The display device according to one exemplary embodiment of the present inventive concept (a1) may include the first and second circular polarizers 240 and 120 for transmitting circularly polarized light, thereby preventing texture phenomenon which might otherwise occur during power on/off.

In contrast, the display device according to a comparative example (a2) allows linearly polarized light to pass through a liquid crystal layer, causing texture phenomenon during power on/off. Thus, the display device according to a comparative example (a2) may have transmission which is lower as much as a predetermined size 12, and slow response speed in an early section 11 due to the texture phenomenon.

Figure 9:
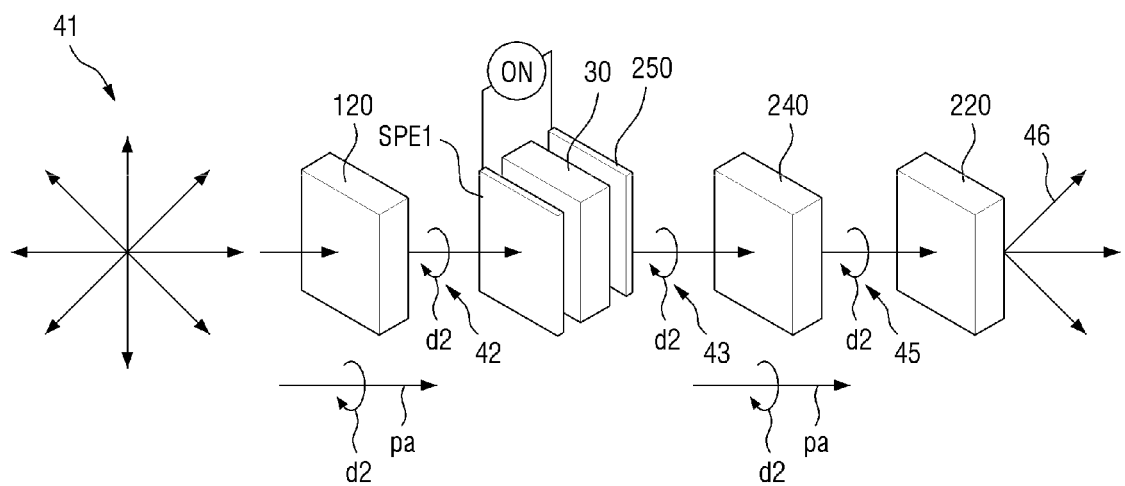
FIG. 9 and FIG. 10 illustrate an operation when an electric field is not generated in a liquid crystal layer according to another exemplary embodiment of the present inventive concept.
Figure 10:
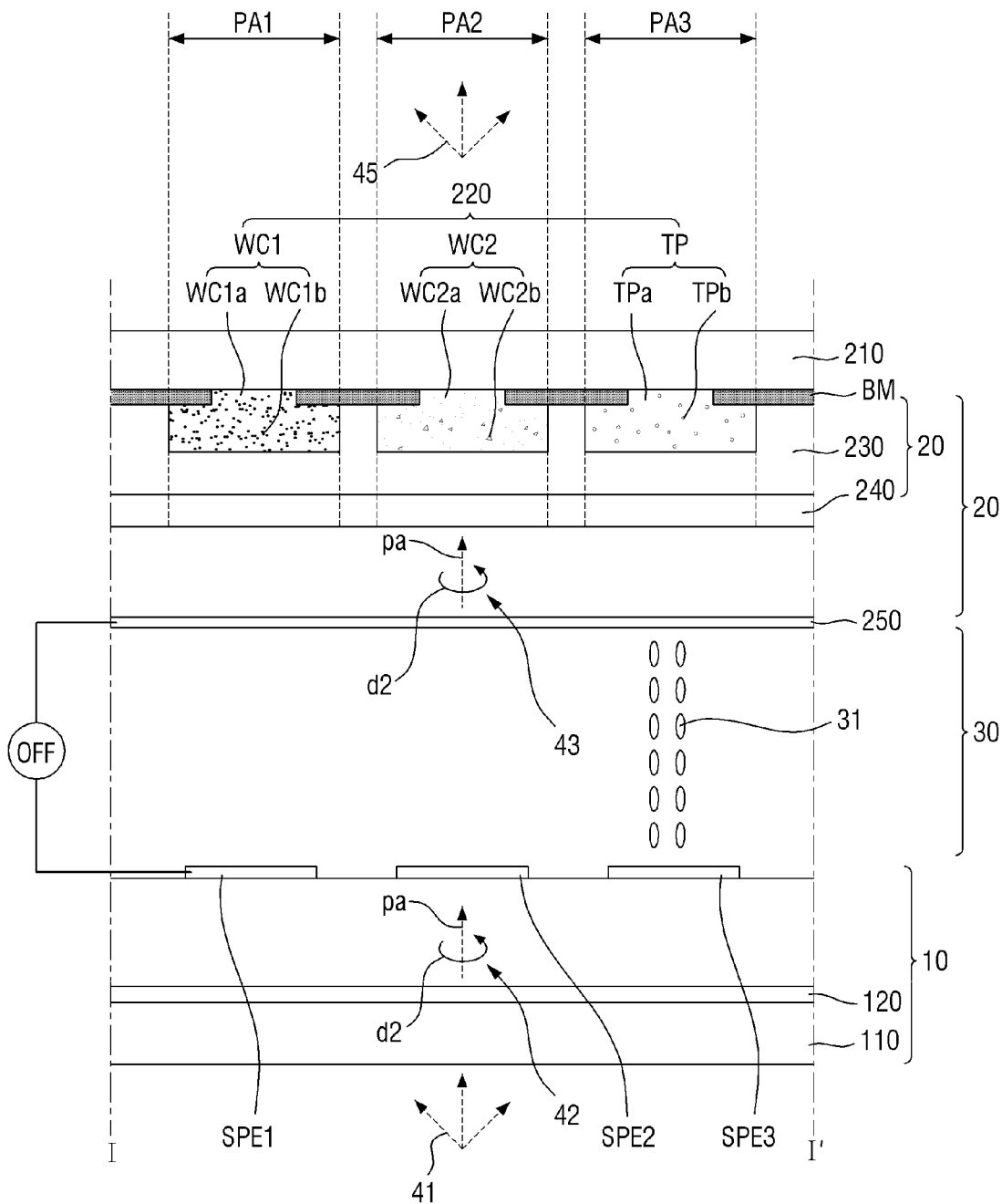
Figure 11:
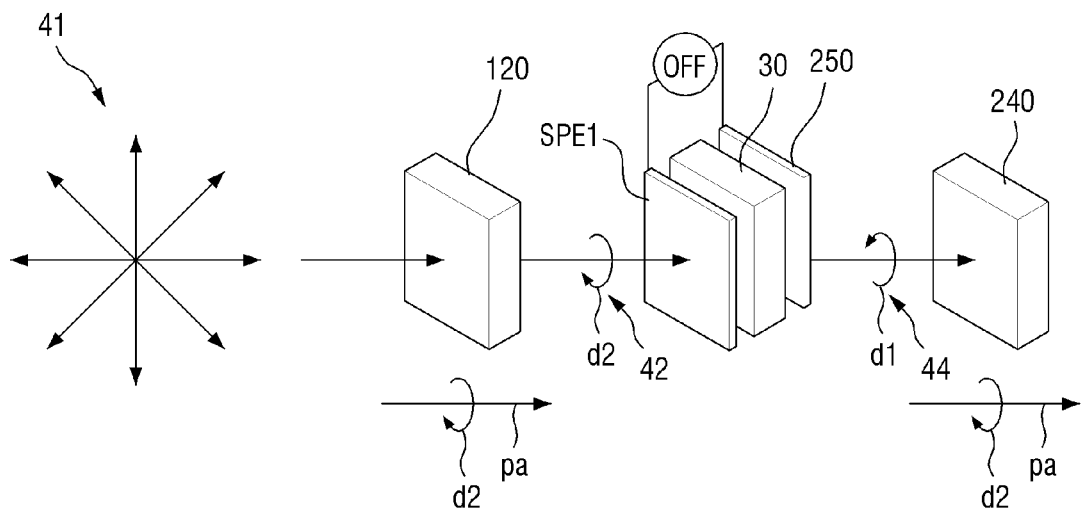
FIG. 11 and FIG. 12 illustrate an operation when an electric field is generated in a liquid crystal layer according to another exemplary embodiment of the present inventive concept.
Figure 12:
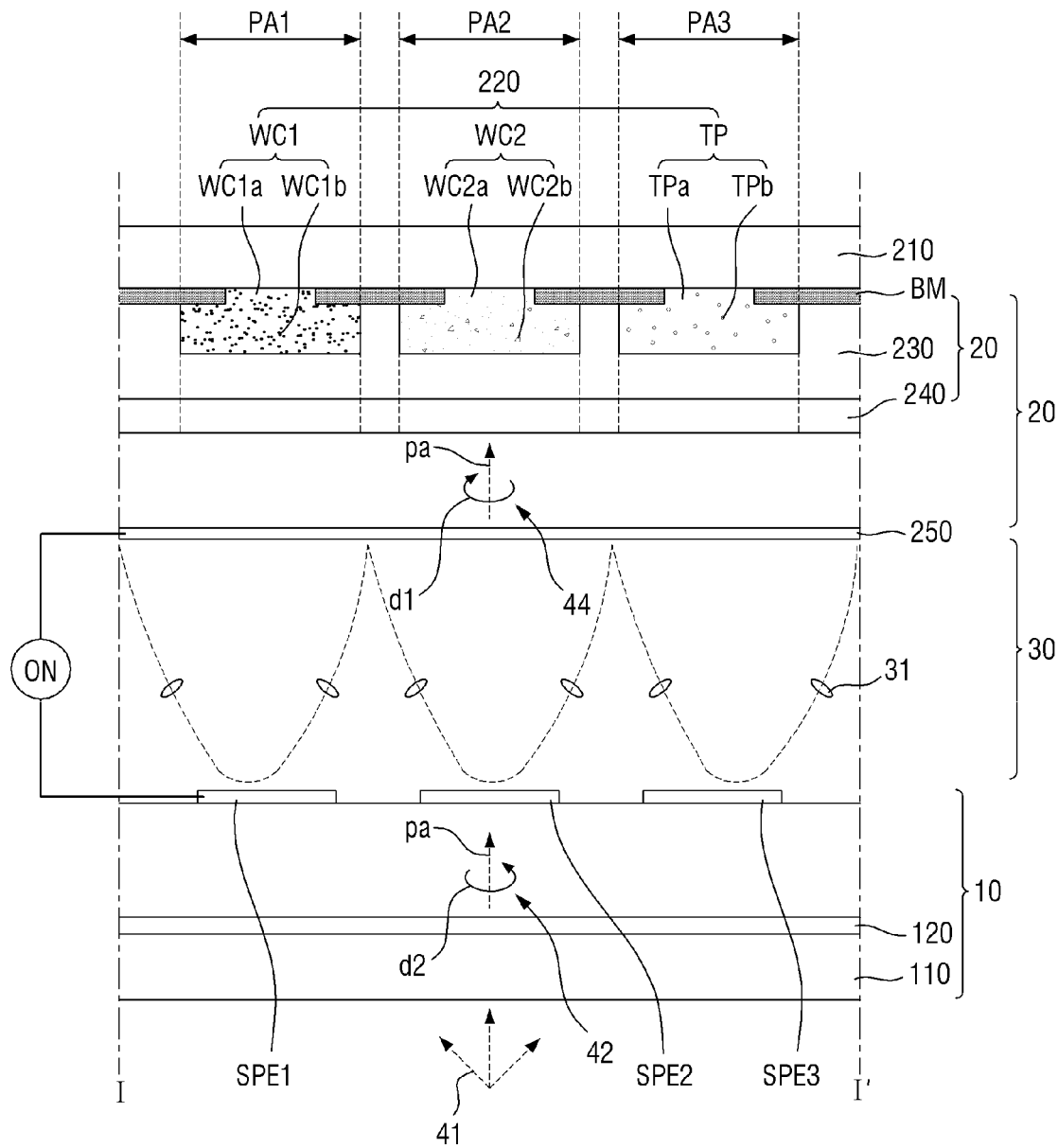

FIG. 9 and FIG. 10 illustrate an operation when an electric field is not generated in a liquid crystal layer according to another exemplary embodiment of the present inventive concept. FIG. 11 and FIG. 12 illustrate an operation when an electric field is generated in a liquid crystal layer according to another exemplary embodiment of the present inventive concept. Descriptions duplicated with those made with reference to FIG. 1 to FIG. 8 will be omitted.

The liquid crystal layer according to another exemplary embodiment of the present inventive concept will be described with reference to FIG. 9 to FIG. 12.

The first circular polarizer 240 may transmit light circularly polarized in the second direction d2 about the transmission axis pa among light provided to the first circular polarizer 240, and block the residual light. That is, the first circular polarizer 240 may transmit light circularly polarized in the second direction d2 which is the same about the second circular polarizer 120 and the transmission axis pa.

A liquid crystal layer in which no electric field is generated in the liquid crystal layer 30 will be described first with reference to FIG. 9 and FIG. 10.

Referring to FIG. 9 and FIG. 10, the light 42 which has passed through the second circular polarizer 120 may be light circularly polarized in the second direction d2 about the transmission axis pa. In an exemplary embodiment, the light 42 which has passed through the second circular polarizer 120 may be right-handed light about the transmission axis pa.

Subsequently, the light 42 which has passed through the second circular polarizer 120 may be provided to the liquid crystal layer 30. Since no electric field is generated in the liquid crystal layer 30, the plurality of liquid crystal molecules 31 having negative dielectric anisotropy may be aligned vertically to the lower substrate 110. Thus, the phase of the light 42 which has passed through the second circular polarizer 120 may not change while passing through the liquid crystal layer 30. Therefore, the light 42 which has passed through the second circular polarizer 120 and the light 43 which has passed through the liquid crystal layer 30 may have the same phase.

The light 43 which has passed through the liquid crystal layer 30 may be provided to the first circular polarizer 240. Since the first circular polarizer 240 may transmit only light circularly polarized in the second direction d2 about the transmission axis pa among light provided to the first circular polarizer 240, the light 43 which has passed through the liquid crystal layer 30 may pass through the first circular polarizer 240. However, an influence caused by other components, such as absorption of the light 43 which has passed through the liquid crystal layer 30 into other components, will not be considered.

The light 45 which has passed through the first circular polarizer 240 may be provided to the color conversion layer 220. Thus, the color conversion layer 220 may receive the light 45 which has passed through the first circular polarizer 240 and emit red, green, and blue light, respectively. Furthermore, the light 46 which has passed through the color conversion layer 220 may be depolarized and maintained at a depolarized state.

An operation when an electric field is generated in the liquid crystal layer 30 will now be described with reference to FIG. 11 and FIG. 12.

Referring to FIG. 11 and FIG. 12, the light 42 which has passed through the second circular polarizer 120 may be provided to the liquid crystal layer 30. Since an electric field is generated in the liquid crystal layer 30, the plurality of liquid crystal molecules 31 having negative dielectric anisotropy may be aligned vertically to the generated electric field.

The liquid crystal layer 30 may change the phase of at least a part of the light 42 which has passed through the second circular polarizer 120. In an exemplary embodiment, the liquid crystal layer 30 may change the phase of the light 42 which has passed through the second circular polarizer 120 as much as 0 to $\pi/2$. Thus, the light 44 which has passed through the liquid crystal layer 30 may include light having a phase which has changed as much as $\pi/2$ as compared with the light 42 which has passed through the second circular polarizer 120. That is, at least a part of the light 44 which has passed through the liquid crystal layer 30 may be light circularly polarized (left-handed) in the first direction d1 about the transmission axis pa.

The light 44 which has passed through the liquid crystal layer 30 may be provided to the first circular polarizer 240. In this case, since the first circular polarizer 240 may transmit only light circularly polarized in the second direction d2 about the transmission axis pa, the light 44 which has passed through the liquid crystal layer 30 may be blocked by the first circular polarizer 240.

Thus, the display device according to another exemplary embodiment of the present inventive concept may display black when no electric field is generated in the liquid crystal layer 30.

Although not shown in the drawings, when the plurality of liquid crystal molecules 31 have positive dielectric anisotropy, the display device may operate in contrast to those described with reference to FIG. 4 to FIG. 7 and FIG. 9 to FIG. 12.

This will be described in more detail with reference to Table 1 below. In this case, the second column of Table 1 shows the case where the first circular polarizer 240 and the second circular polarizer 120 transmit light circularly polarized in opposite directions about the transmission axis pa. Furthermore, the third column of Table 1 shows the case where the first circular polarizer 240 and the second circular polarizer 120 transmit light circularly polarized in the same direction about the transmission axis pa.

TABLE 1

|  | Negative dielectric anisotropy | | Positive dielectric anisotropy | |
| --- | --- | --- | --- | --- |
|  | Generated electric field X | Generated electric field O | Generated electric field X | Generated electric field O |
| Opposite directions | Black | Light emission | Light emission | Black |
| Same direction | Light emission | Black | Black | Light emission |

Referring to Table 1, when the plurality of liquid crystal molecules 31 have positive dielectric anisotropy, the plurality of liquid crystal molecules 31 may be aligned vertically to the lower substrate 110 when an electric field is generated in the liquid crystal layer 30.

Since the phase of light passing through the liquid crystal layer 30 does not change, the display device according to another exemplary embodiment of the present inventive concept displays black when the first circular polarizer 240 and the second circular polarizer 120 transmit light circularly polarized in opposite directions about the transmission axis pa.

Furthermore, in an exemplary embodiment, when the plurality of liquid crystal molecules 31 have positive dielectric anisotropy, the plurality of liquid crystal molecules 31 may be aligned horizontally to the lower substrate 110 when no electric field is generated in the liquid crystal layer 30.

The liquid crystal layer 30 may change the phase of the light provided to the liquid crystal layer 30 as much as 0 to $\pi/2$. Thus, the light which has passed through the liquid crystal layer 30 may include light having a phase which has changed as much as $\pi/2$ as compared with the light 42 which has passed through the second circular polarizer 120.

Therefore, when the first circular polarizer 240 and the second circular polarizer 120 transmit light circularly polarized in opposite directions about the transmission axis pa, the light which has passed through the liquid crystal layer 30 may at least partially pass through the first circular polarizer 240. The light which has passed through the first circular polarizer 240 may be provided to the color conversion layer 220, and the color conversion layer 220 may receive the light which has passed through the first circular polarizer 240 and emit red, green, and blue light, respectively. The light which has passed through the color conversion layer 220 may be depolarized and maintained at a depolarized state.

FIG. 13 to FIG. 16 are cross-sectional views illustrating a display device according to still another exemplary embodiment of the present inventive concept. The description redundant with that made with reference to FIG. 1 and FIG. 12 will be omitted.

Figure 13:
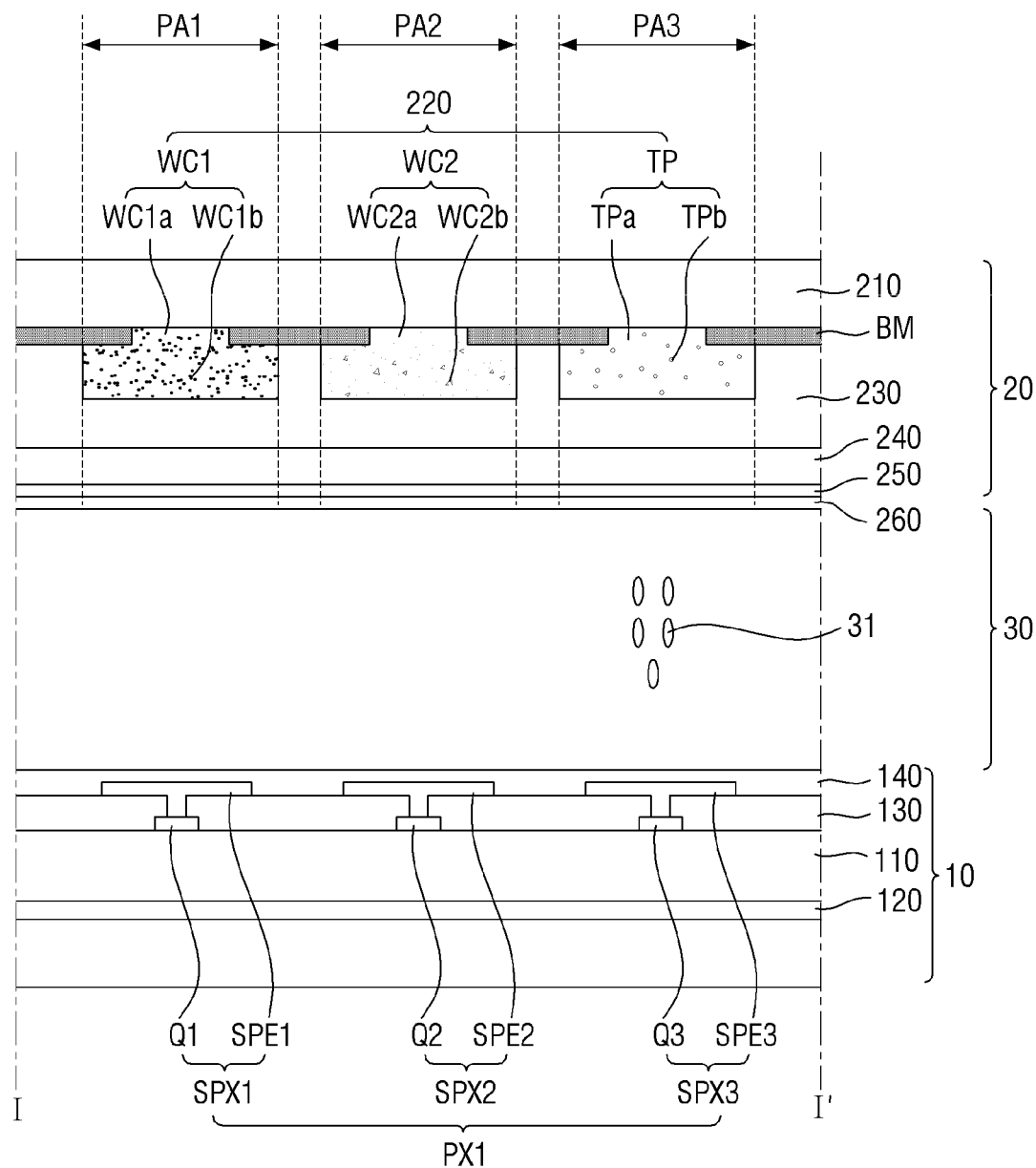
FIG. 13, FIG. 14, FIG. 15, and FIG. 16 are cross-sectional views illustrating a display device according to still another exemplary embodiment of the present inventive concept.

Referring to FIG. 13, the second circular polarizer 120 may be disposed at the other surface of the lower substrate 110. More specifically, the lower substrate 110 may include one surface facing the upper substrate 210, and the other surface opposite to the one surface. The second circular polarizer 120 may be disposed on the other surface of the lower substrate 110.

Although not shown in the drawings, other components may be provided between the second circular polarizer 120 and the insulation layer 130, and the second circular polarizer 120 may be disposed on the first to third switching elements Q1 to Q3.

Figure 14:
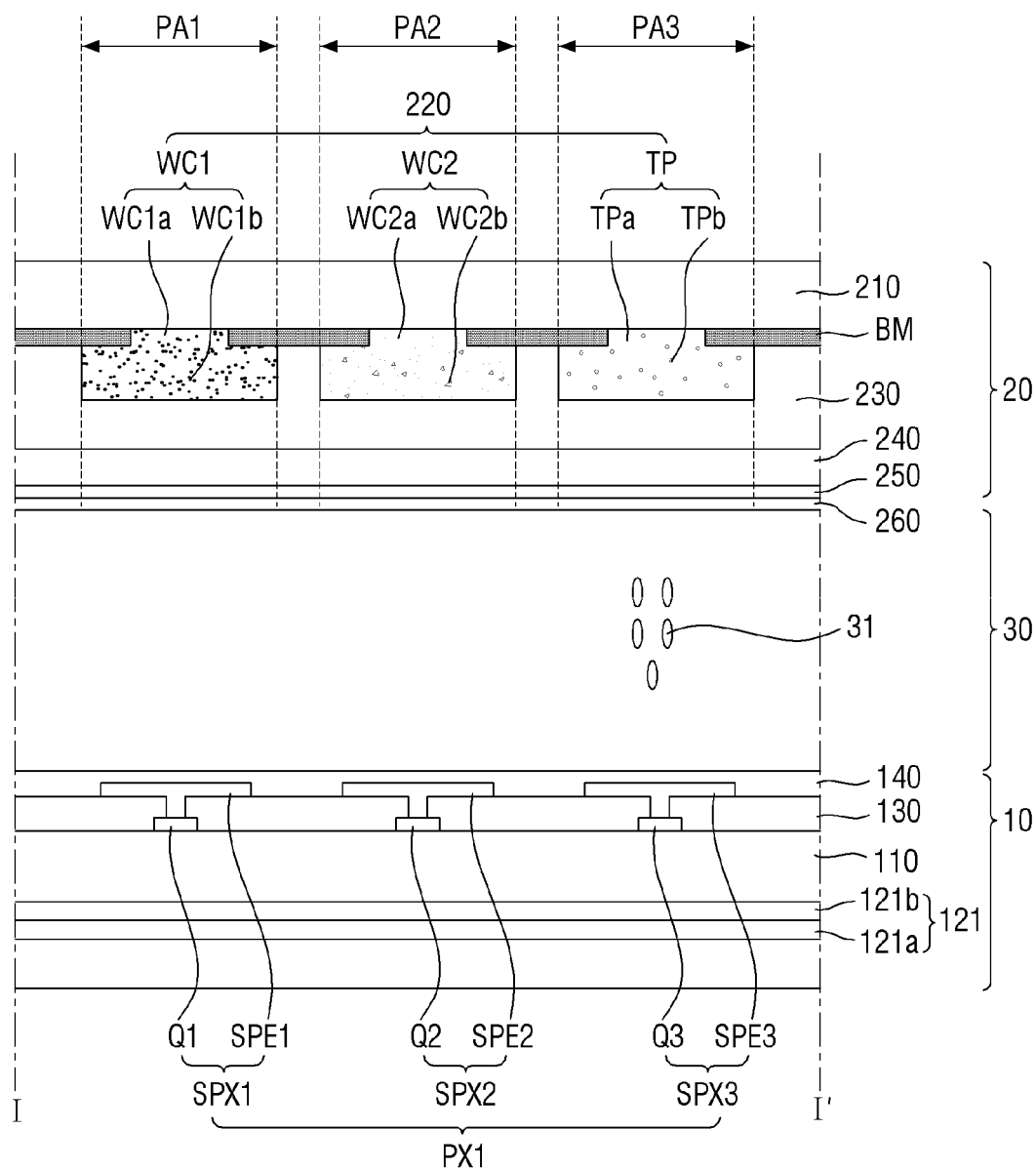

Referring to FIG. 14, the display device according to still another exemplary embodiment of the present inventive concept may further include a wave plate 121. The wave plate 121 may be disposed on the other surface of the lower substrate 110. However, the present disclosure is not limited thereto, and the wave plate 121 may be disposed on the one surface of the lower substrate 110. The wave plate 121 may change depolarized light provided from a source external to the wave plate 121 into light circularly polarized in a specific direction about the transmission axis pa. In this case, the specific direction may be the first direction d1 or the second direction d2 about the transmission axis pa.

The wave plate 121 may include a linear polarizer 121*a* for transmitting therethrough only linearly polarized light among depolarized light provided from an external source, and a phase retarder 121*b* for retarding the phase of the light which has passed through the linear polarizer 121*a*. In an exemplary embodiment, the phase retarder 121*b* may change the phase of the light which has passed through the linear polarizer 121*a* as much as π/4.

Thus, the second circular polarizer 120 may be omitted in the display device according to still another exemplary embodiment of the present inventive concept.

Figure 15:
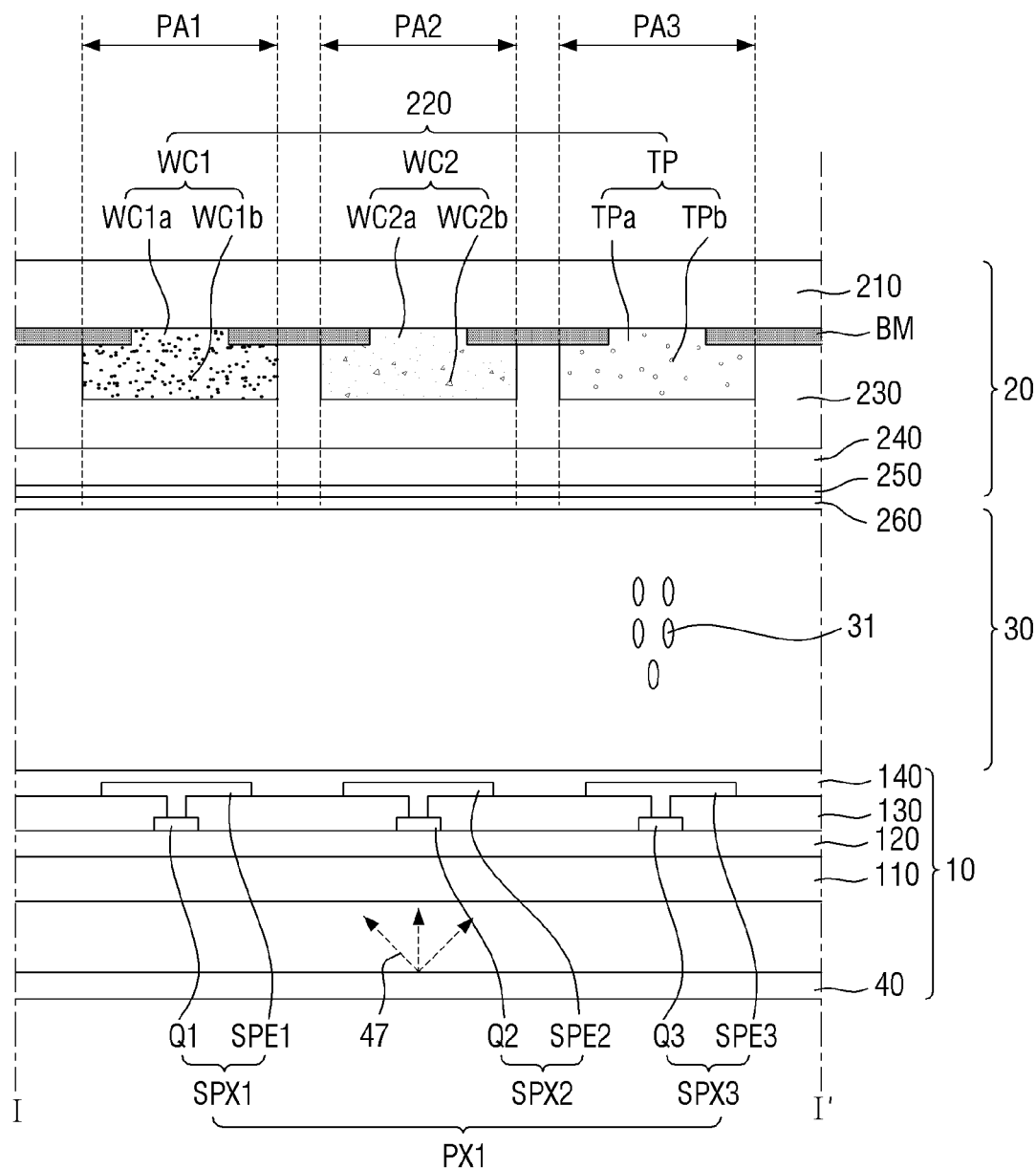

Referring to FIG. 15, the display device according to still another exemplary embodiment of the present inventive concept may further include the backlight unit 40. The backlight unit 40 may provide light 47 having the first wavelength region to the lower substrate 110. In this case, the first wavelength region may have a central wavelength of approximately 430 nm to 470 nm, and thus the light 47 having the first wavelength region may be blue light.

The backlight unit 40 may include a light source, an optical member, and a reflective member. The light source may include an LED light source, an OLED light source, a fluorescent lamp light source, and the like. The light source may emit the light 47 having the first wavelength region toward the lower substrate 110. In this case, the light 47 having the first wavelength region shown in FIG. 15 may be an example of the light at a depolarized state described with reference to FIG. 4.

Figure 16:
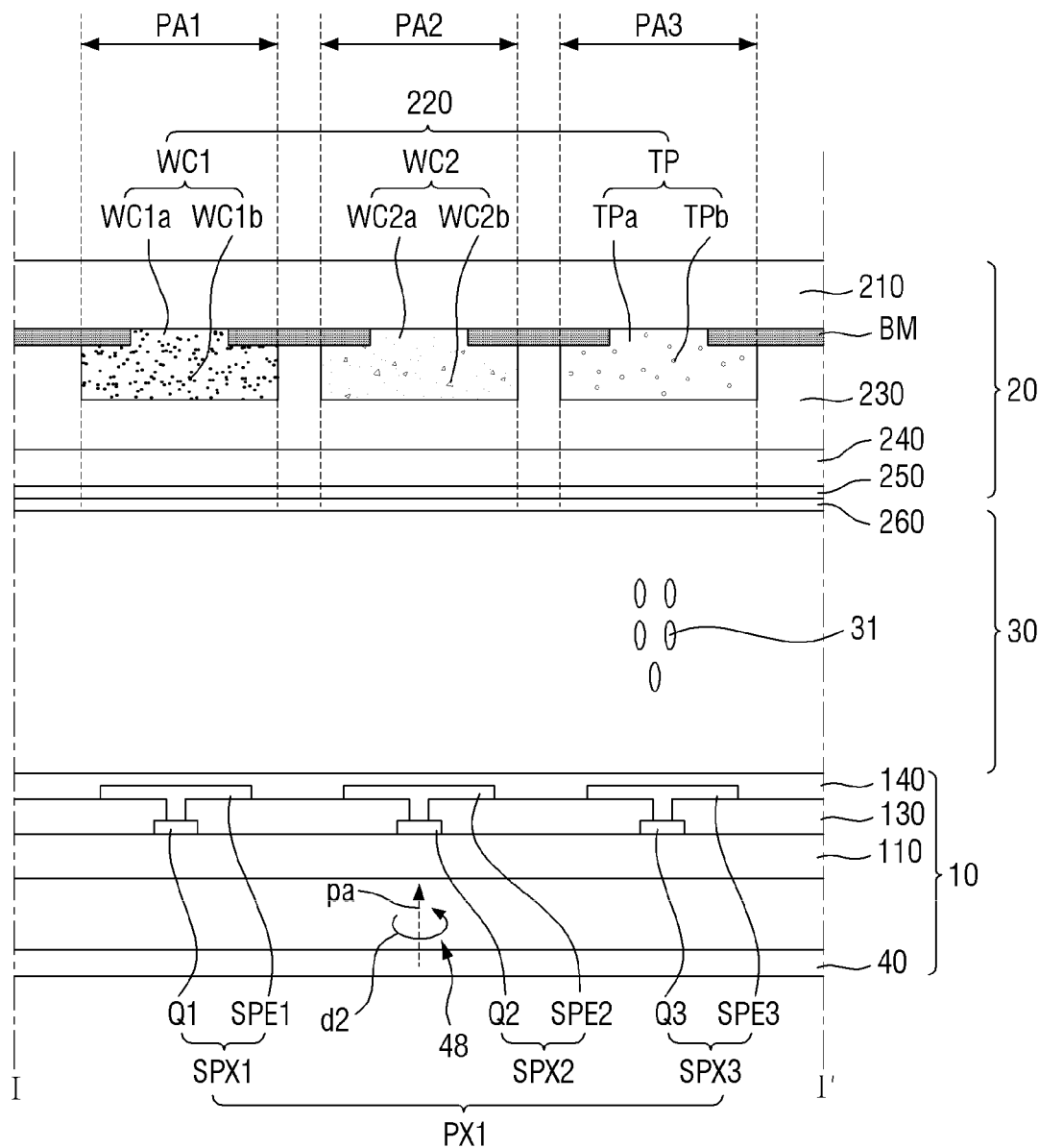

Referring to FIG. 16, the display device according to still another exemplary embodiment of the present inventive concept may include the backlight unit 40 for providing light 48 circularly polarized in a specific direction about the transmission axis pa. In this case, the specific direction may be the first direction d1 or the second direction d2 about the transmission axis pa. FIG. 16 illustrates the exemplary embodiment in the second direction d2. That is, the backlight unit 40 may provide, to the lower substrate 110, light having the first wavelength region and circularly polarized in the first direction d1 about the transmission axis pa.

Thus, the first circular polarizer 120 for transmitting light circularly polarized in a specific direction about the transmission axis pa among depolarized light may be omitted in the display device according to still another exemplary embodiment of the present inventive concept.

While the present inventive concept has been particularly shown and described with reference to exemplary embodiments thereof, but this is merely exemplary, and the present disclosure is not limited thereto, and it will be understood by those of ordinary skill in the art that various changes and applications may be made therein without departing from the spirit and scope of the present inventive concept as defined by the following claims. For example, the respective components of the exemplary embodiments of the present inventive concept can be modified. It is therefore desired that the present embodiments be considered in all respects as illustrative and not restrictive, reference being made to the appended claims rather than the foregoing description to indicate the scope of the invention.

What is claimed is:

1. A display device comprising:
   a first substrate;
   a second substrate facing the first substrate;
   a color conversion layer disposed on one surface of the second substrate and including wavelength conversion materials;
   a black matrix layer disposed between the second substrate and the color conversion layer;
   a first circular polarizer disposed on the color conversion layer;
   a second circular polarizer disposed on one surface of the first substrate facing one surface of the second substrate and an other surface of the first substrate opposed to the one surface of the first substrate; and
   a planarization layer disposed between the first circular polarizer and the color conversion layer,
   wherein the color conversion layer is partially overlapped with the black matrix layer, and
   wherein the planarization layer partially contacts an upper surface of the black matrix.

2. The display device of claim 1, wherein the first circular polarizer passes, from among light provided to the first circular polarizer, light circularly polarized in a first direction about a transmission axis, and wherein the second circular polarizer passes, from among light provided to the second circular polarizer, light circularly polarized in a second direction about the transmission axis.

3. The display device of claim 2, wherein the first direction and the second direction are opposite to each other about the transmission axis.

4. The display device of claim 1, further comprising a second electrode disposed on the second circular polarizer; a first electrode disposed on the first substrate and overlapped with the second electrode; and a liquid crystal layer interposed between the first substrate and the second substrate,
   wherein the first circular polarizer is disposed between the second substrate and the liquid crystal layer.

5. The display device of claim 4, wherein the liquid crystal layer includes a plurality of liquid crystal molecules having negative dielectric anisotropy, and when an electric field is generated between the first electrode and the second electrode, the liquid crystal layer changes a phase of light provided to the liquid crystal layer as much as π/2.

6. The display device of claim 4, wherein the liquid crystal layer includes a plurality of liquid crystal molecules having positive dielectric anisotropy, and when an electric field is not generated between the first electrode and the second electrode, the liquid crystal layer changes a phase of light provided to the liquid crystal layer as much as π/2.

7. The display device of claim 1, wherein at least one of the first circular polarizer and the second circular polarizers includes an organic material.

8. The display device of claim 1, wherein the color conversion layer includes:
   a first wavelength conversion layer for receiving light having a first wavelength region and converting the light having a first wavelength region into light having a second wavelength region;
   a second wavelength conversion layer for receiving light having a first wavelength region and converting the light having a first wavelength region into light having a third wavelength region; and
   a transmission layer for transmitting the light having the first wavelength region,
   wherein the wavelength conversion materials are included in the first and second wavelength conversion layers.

9. The display device of claim 8, wherein the light having a first wavelength region is blue light, the light having a second wavelength region is red light, and the light having a third wavelength region is green light.

10. A display device comprising:
    a first substrate;
    a second substrate facing the first substrate;
    a liquid crystal layer interposed between the first substrate and the second substrate;
    a color conversion layer disposed on the second substrate and including wavelength conversion materials;

a black matrix layer disposed between the second substrate and the color conversion layer;

a first circular polarizer disposed on the color conversion layer; and a planarization layer disposed between the first circular polarizer and the color conversion layer, wherein the color conversion layer is partially overlapped with the black matrix layer, wherein the planarization layer partially contacts an upper surface of the black matrix, and wherein the first circular polarizer passes, from among light passing through the liquid crystal layer, light circularly polarized in a first direction about a transmission axis.

11. The display device of claim 10, further comprising a second circular polarizer disposed on either one surface or the other surface of the first substrate, wherein the second circular polarizer passes, from among light provided to the second circular polarizer, light circularly polarized in a second direction about the transmission axis, and wherein the first direction and the second direction are opposite to each other about the transmission axis.

12. The display device of claim 11, wherein the liquid crystal layer includes a plurality of liquid crystal molecules having negative dielectric anisotropy, and when an electric field is generated in the liquid crystal layer, the liquid crystal layer changes a phase of light provided to the liquid crystal layer as much as $\pi/2$.

13. The display device of claim 11, wherein the liquid crystal layer includes a plurality of liquid crystal molecules having positive dielectric anisotropy, and when an electric field is not generated in the liquid crystal layer, the liquid crystal layer changes a phase of light provided to the liquid crystal layer as much as $\pi/2$.

14. The display device of claim 10, further comprising a second circular polarizer disposed on either one surface or the other surface of the first substrate, wherein the second circular polarizer passes light circularly polarized in a second direction about the transmission axis among light provided to the second circular polarizer, and the first direction and the second direction are the same about the transmission axis.

15. The display device of claim 10, wherein the first substrate includes one surface facing the second substrate, and the other surface opposite to the one surface of the first substrate, the display device further comprising a wave plate disposed on the other surface of the first substrate, the wave plate including a linear polarizer for transmitting linearly polarized light among light provided to the wave plate, and a phase retarder for changing a phase of the linearly polarized light as much as $\pi/4$.

16. The display device of claim 10, further comprising a backlight unit for providing a light having a first wavelength region to the first substrate.

17. The display device of claim 16, wherein the light having a first wavelength region provided from the backlight unit is circularly polarized in a second direction opposite to the first direction about the transmission axis.

18. The display device of claim 16, wherein the color conversion layer includes:

a first wavelength conversion layer for receiving the light having a first wavelength region and converting the light having a first wavelength region into light having a second wavelength region;

a second wavelength conversion layer for receiving the light having a first wavelength region and converting the light having a first wavelength region into light having a third wavelength region; and a transmission layer for transmitting the light having a first wavelength region, wherein the wavelength conversion materials are included in the first and second wavelength conversion layers.

19. The display device of claim 18, wherein the light having a first wavelength region is blue light, the light having a second wavelength region is red light, and the light having a third wavelength region is green light.

20. The display device of claim 10, wherein the first circular polarizer includes an organic material.

* * * * *